(12) United States Patent
Kulesha

(10) Patent No.: US 8,783,285 B2
(45) Date of Patent: Jul. 22, 2014

(54) METHOD AND APPARATUS FOR A SMART VALVE

(75) Inventor: Richard L. Kulesha, Bear, DE (US)

(73) Assignee: The Boeing Company, Chicago, IL (US)

( * ) Notice: Subject to any disclaimer, the term of this patent is extended or adjusted under 35 U.S.C. 154(b) by 1332 days.

(21) Appl. No.: 12/026,301

(22) Filed: Feb. 5, 2008

(65) Prior Publication Data

US 2009/0194718 A1    Aug. 6, 2009

(51) Int. Cl.
*F16K 15/06* (2006.01)
*F16K 15/18* (2006.01)

(52) U.S. Cl.
USPC ........ 137/541; 137/522; 137/542; 137/899.2; 251/129.01; 251/337; 236/92 R; 236/93 R

(58) Field of Classification Search
USPC ........... 137/511, 540, 541, 542, 899.2, 512.1, 137/522; 251/337, 129.01; 236/92 R, 93 R
See application file for complete search history.

(56) References Cited

U.S. PATENT DOCUMENTS

| | | | | | |
|---|---|---|---|---|---|
| 58,934 | A | * | 10/1866 | Anderson | 137/541 |
| 1,093,576 | A | * | 4/1914 | McNutt | 137/541 |
| 1,419,177 | A | * | 6/1922 | Stahl | 137/899.2 |
| 2,072,271 | A | * | 3/1937 | Meadows | 137/541 |
| 2,144,288 | A | * | 1/1939 | Gibbons | 137/514.5 |
| 2,155,124 | A | * | 4/1939 | Gibbons | 137/541 |
| 2,351,874 | A | * | 6/1944 | Parker | 137/542 |
| 2,767,735 | A | * | 10/1956 | Darling | 137/527 |
| 2,793,649 | A | * | 5/1957 | Hamer | 137/517 |
| 2,796,882 | A | * | 6/1957 | Bradley | 137/512 |
| 3,035,604 | A | * | 5/1962 | Portis | 137/541 |
| 3,044,762 | A | * | 7/1962 | Stengelin | 137/541 |
| 3,126,909 | A | * | 3/1964 | Sweatt et al. | 137/471 |
| 3,131,718 | A | * | 5/1964 | Mingrone | 137/541 |
| 4,056,121 | A | * | 11/1977 | Gerdes | 137/541 |
| 4,186,872 | A | * | 2/1980 | Bland et al. | 137/512.1 |
| 4,294,281 | A | * | 10/1981 | Gerdes | 137/541 |
| 4,388,940 | A | * | 6/1983 | Powell | 137/541 |
| 4,674,530 | A | * | 6/1987 | Bickford | 137/541 |
| 4,938,254 | A | * | 7/1990 | Gimby | 137/541 |
| 4,962,548 | A | * | 10/1990 | van Deventer et al. | 137/512.1 |
| 5,255,809 | A | * | 10/1993 | Ervin et al. | 137/843 |
| 5,580,240 | A | * | 12/1996 | Hattori | 251/337 |
| 7,097,131 | B2 | * | 8/2006 | Palmer et al. | 244/1 A |
| 2002/0092567 | A1 | * | 7/2002 | Herz | 137/541 |
| 2008/0078457 | A1 | * | 4/2008 | Sandiford | 137/493 |

FOREIGN PATENT DOCUMENTS

| | | | | | |
|---|---|---|---|---|---|
| JP | 60164079 | A | * | 8/1985 | 137/543.17 |
| JP | 63270982 | A | * | 11/1988 | 137/511 |

OTHER PUBLICATIONS

INHA University, SSS Lab< "Shape Memory Alloy", 3 pgs, 2007 [online], [retrieved on Jun. 30, 2011], Retrieved from the Internet URL: http://www.ssslab.com/ehtml/3_4.php.*

* cited by examiner

*Primary Examiner* — John Rivell
(74) *Attorney, Agent, or Firm* — Yee & Associates, P.C.

(57) ABSTRACT

A smart drain valve comprises a support plate, a bolt passing through a center of the support plate, an outer plate connected to a first end of the bolt, an inner plate connected to a second end of the bolt, and a spring positioned between the inner plate and the support plate. The spring is made of a shape memory material.

19 Claims, 7 Drawing Sheets

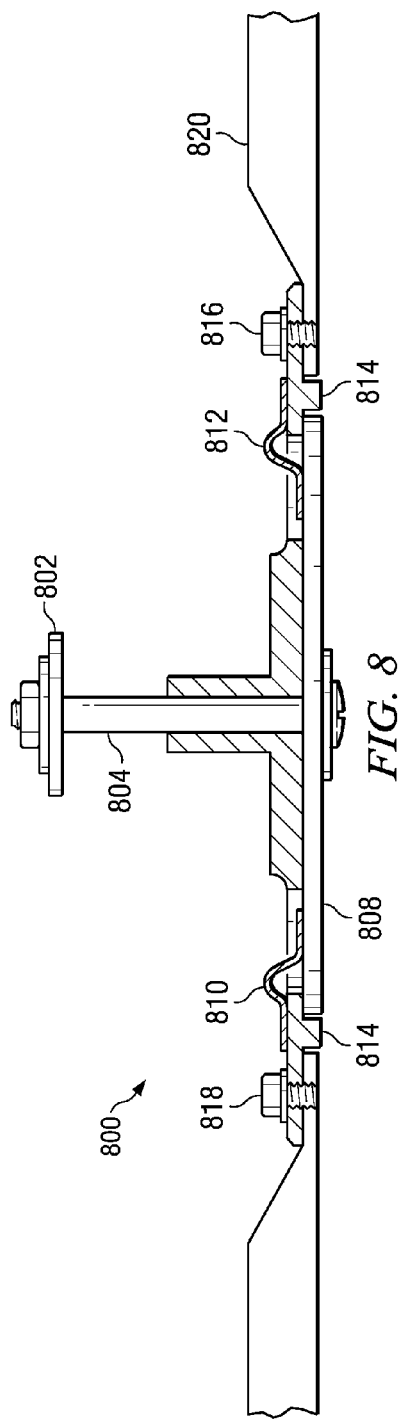
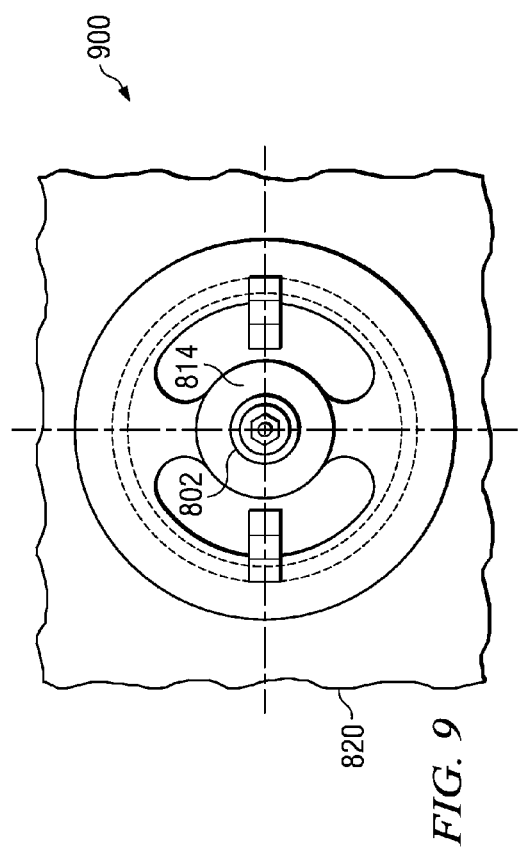

METHOD AND APPARATUS FOR A SMART VALVE

BACKGROUND INFORMATION

1. Field

The present disclosure relates generally to drains and in particular to mechanical drains. More particularly, the present application is directed to a method and apparatus for drain valves composed of shape memory alloys.

2. Background

Pods, enclosures, and various structures during their service life collect large amounts of moisture or water inside the enclosure, structure, or pods. The water is collected by condensation from atmospheric conditions, operating environmental control systems, and other avionics and electrical equipment. This collecting water may create corrosion issues that may damage the underlying structure and other components.

Currently, moisture and fluids may be drained from enclosures using open drain holes. In cases where the enclosure producing the moisture is sealed, drain holes may not be practical.

Mechanical drains may also be used. The mechanical drains are opened and closed manually by a technician or other personnel. However, it may not be possible to eliminate or drain the water by a technician using a mechanical drain when the aircraft, cargo hauler, or other apparatus is in operation or when it is difficult or impossible to reach the mechanical drain.

Existing solutions are open and/or mechanically plugged drain holes in a structure. In some aircraft, open drain holes are provided on the lower skin of the avionics bays. These small drain holes are used to drain the water from the bay. However, large amounts of water can sometimes collect at times as the humidity increases, significant accumulation occurs potentially making it difficult to eliminate water from the bay.

The open holes may become clogged with dirt, mud, and other foreign objects that can block the drain hole and prevent draining of the enclosed bay. In addition, open holes sometimes require wire mesh to be placed over the open holes in areas where avionics equipment is installed to prevent electromagnetic buildup. However, the wire mesh can permit dirt, mud, and other foreign objects to clog the wire holes or openings and further prevent draining of the enclosed bay.

In addition, some aircraft are capable of landing in water, but in order to accomplish a water landing with the aircraft, drain plugs must be installed in all the drain holes before a water landing can be made. The installation of the plugs takes approximately 1.5 hours for a single crewmember or 25 minutes for 3 crewmembers. Although the fuselage is somewhat sealed, water may still collect in the bilge area. There may be no way to remove the standing water in the bilge area until after the aircraft lands at an airport or other maintenance facility.

In addition, currently available valves that are electrically operated using magnetic switches and other solenoid operated valves are heavy and need to be sealed for use in a high moisture environment.

SUMMARY

The advantageous embodiments of the present disclosure provide a method and apparatus for drain valves made using shape memory alloys. The advantageous embodiments provide a smart drain valve that comprises a support plate; a bolt passing through a center of the support plate; an outer plate connected to a first end of the bolt; an inner plate connected to a second end of the bolt; and a spring positioned between the inner plate and the support plate. The spring is made of a shape memory alloy.

In another embodiment, an aircraft having a drain valve is provided. The drain valve comprises an inner plate; a support plate located below the inner plate; and a biasing member located between the inner plate and the support plate. The biasing member is made of a shape memory alloy that changes configuration in response to a trigger event to push the inner plate away from the support plate to form an opening. Fluid drains through the opening.

Another embodiment provides a method for draining fluid from an enclosure. In response to an accumulation of fluid in an enclosure, an electric current is sent to a smart drain valve associated with the enclosure. The smart drain valve comprises a set of springs. At least one spring in the set of springs is made of a shape memory material. The shape memory material changes from a first configuration to a second configuration in a presence of the electric current to actuate the smart drain valve to an open position. In response to a determination that the fluid has drained out of the enclosure, the electric current to the smart drain valve is stopped. The at least one spring in the set of springs in the smart drain valve changes from the second configuration back to the first configuration in an absence of the electric current to actuate the smart drain valve to a closed position.

Thus, the advantageous embodiments provide a smart drain valve that uses shape memory alloys for valve actuation to provide a lightweight, low cost, automatic, or remotely operated drain valve to eliminate fluid from pods and other enclosures. The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

FIG. 8 is a block diagram of a cross-sectional view of a smart drain valve having a smart memory alloy flat spring in accordance with an advantageous embodiment;

FIG. 9 is a block diagram of a top view of a smart drain valve having a smart memory alloy flat spring in a closed position in accordance with an advantageous embodiment;

DETAILED DESCRIPTION

Figure 1:
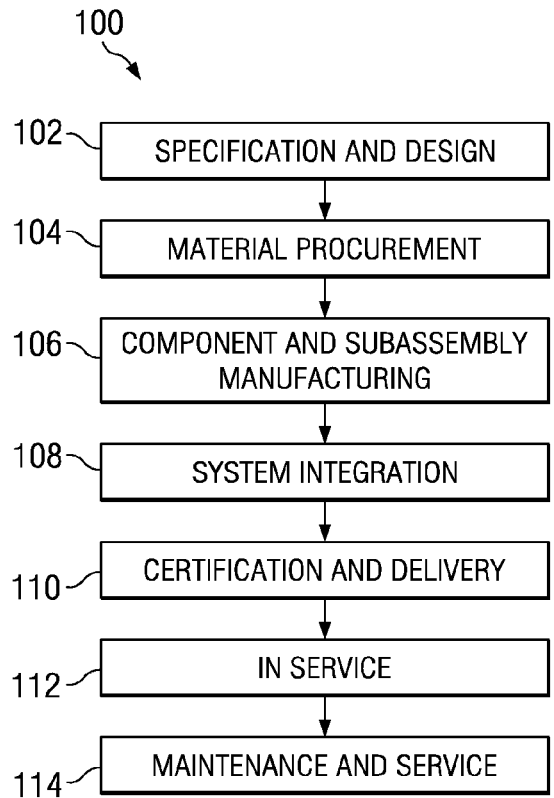
FIG. 1 is a diagram illustrating an aircraft manufacturing and service method in accordance with an advantageous embodiment.
Figure 2:
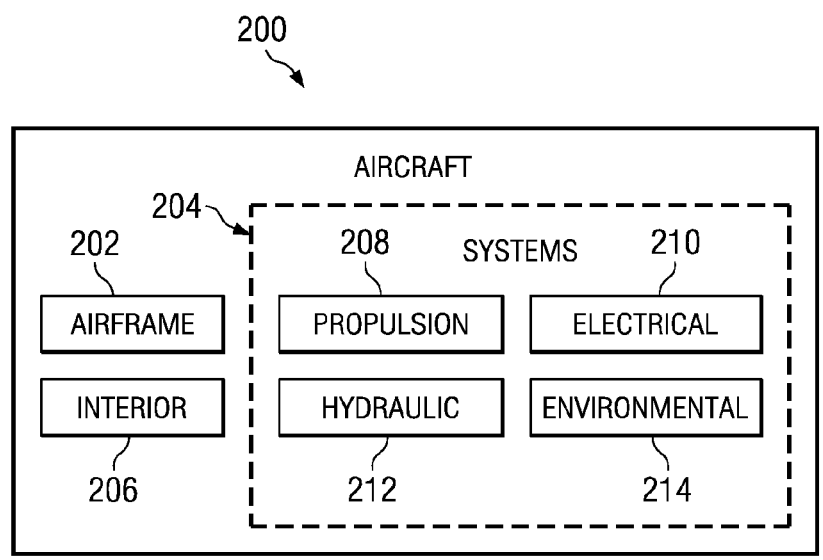
FIG. 2 is a diagram of an aircraft in accordance with an advantageous embodiment.

Referring more particularly to the drawings, embodiments of the disclosure may be described in the context of the aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment. During pre-production, exemplary aircraft manufacturing and service method 100 may include specification and design 102 of aircraft 200 in FIG. 2 and material procurement 104. During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in accordance with an advantageous embodiment. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1. Also, one or more apparatus embodiments, method embodiments, or a combination thereof may be utilized during production stages, such as component and subassembly manufacturing 106 and system integration 108 in FIG. 1, for example, without limitation, by substantially expediting the assembly of or reducing the cost of aircraft 200. Similarly, one or more of apparatus embodiments, method embodiments, or a combination thereof may be utilized while aircraft 200 is in service 112 or during maintenance and service 114 in FIG. 1.

Currently, water may be drained from a compartment using holes in the compartment. However, these open holes may become clogged with mud or other debris. In addition, currently available valves that are electrically operated to open and close drains using magnetic switches and other solenoid operated valves are heavy and need to be sealed for use in a high moisture environment. Thus, there is a need for a drain valve that eliminates the problem of a solenoid operated and/or technician operated mechanical drain valve(s), that are light weight, self actuating, or can be actuated remotely with solenoids.

An advantageous embodiment provides a smart drain valve that comprises a support plate; a bolt passing through a center of the support plate; an outer plate connected to a first end of the bolt; an inner plate connected to a second end of the bolt; and a spring positioned between the inner plate and the support plate. The spring is made of a shape memory alloy. The smart drain valve utilizes shape memory materials, such as Nickel-titanium, for the temperature change, differential pressure, and low power actuated spring.

In another embodiment, an aircraft having a drain valve is provided. The drain valve comprises an inner plate; a support plate located below the inner plate; and a biasing member located between the inner plate and the support plate. The biasing member is a device or component for decompresses or otherwise changes configuration to push the inner plate away from the support plate to permit fluids to drain from an enclosure associated with the drain valve. The biasing member may be, without limitation, a spring, a Belleville washer, or any other type of biasing member. A spring may include, without limitation, a leaf spring or a coil spring. The biasing member is made of a shape memory alloy that changes configuration in response to a trigger event to push the outer plate away from the support plate to form an opening. Fluid may then drain through the opening.

In yet another advantageous embodiment, an apparatus for draining fluid from an enclosure is provided. The apparatus comprises a pod assembly and a smart drain valve associated with the pod assembly. The smart drain valve includes a support plate; a bolt passing through a center of the support plate; an outer plate connected to a first end of the bolt; an inner plate connected to a second end of the bolt; and a set of springs. The set of springs is a set of one or more springs. In other words, the set of springs may include only a single spring, as well as two or more springs.

The at least one spring in the set of springs is positioned between the inner plate and the support plate. The at least one spring is made of a shape memory alloy. The shape memory alloy changes from a first configuration to a second configuration in a presence of a trigger event. A change from the first configuration to the second configuration actuates the smart drain valve to an open position.

Figure 3:
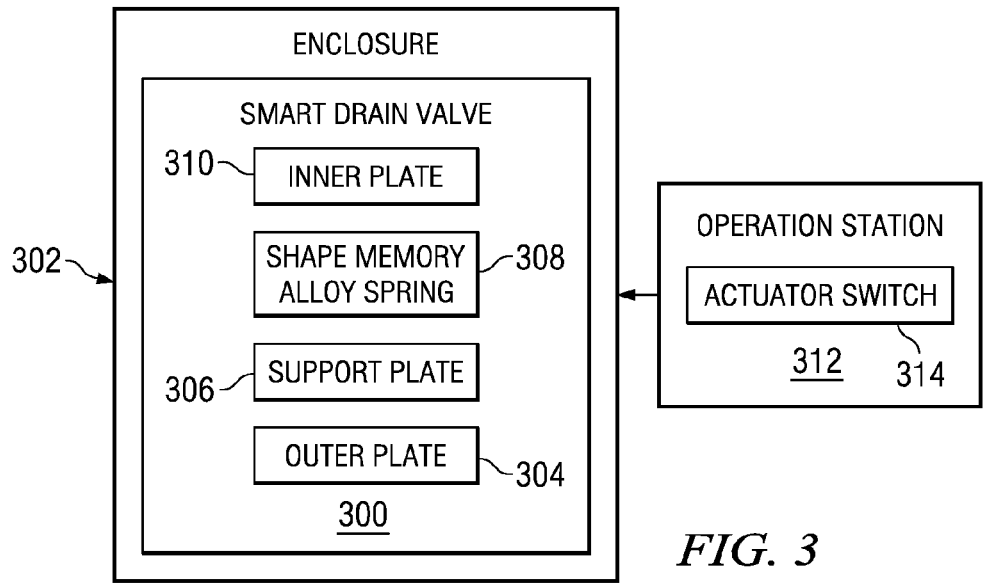
FIG. 3 is a block diagram of a smart drain valve in accordance with an advantageous embodiment.

FIG. 3 is a block diagram of a smart drain valve in accordance with an advantageous embodiment. Smart drain valve 300 is a drain valve in enclosure 302. Enclosure 302 may be any type of compartment, pod, or other structure having an interior space capable of collecting water or other moisture. A pod is a streamlined enclosure or detachable container. A pod may include, without limitation, an environmental control systems pod, an electronics system pod, an engine pod, a storage bay, a fuselage structure, or any aircraft or non-aircraft related enclosure.

In this example, enclosure 302 is an enclosure on an aircraft, such as a helicopter or airplane. However, in other embodiments, enclosure 302 may be an enclosure in any type of structure or transportation vehicle, including, without limitation, a train car, a boat, an amphibious car, an engine compartment, or any other type of structure.

Outer plate 304 is a flat sheet or piece of metal or other appropriate material associated with a bottom portion of smart drain valve 300. Outer plate 304 is fixed or connected to an end of a bolt. The other end of the bolt passes through the center of support plate 306. Inner plate 310 is fixed or connected to an opposite end of the bolt. Inner plate 310 is a flat sheet or piece of metal. Inner plate 310 is a movable valve plate that is substantially flush with the surface of enclosure 302 when smart drain valve 300 is in a closed position.

Shape memory alloy spring 308 is a spring that is made of a shape memory alloy. In other words, shape memory alloy spring 308 is any type of spring that is manufactured from one or more shape memory alloys. Shape memory alloy may also be referred to as a smart alloy or a memory metal.

A shape memory alloy is a material that remembers its geometry. When a shape memory alloy has been deformed from its original crystallographic configuration, the shape memory alloy returns to its original geometry in response to a trigger event. A trigger event is any event or change in conditions that triggers the shape memory alloy in shape memory alloy spring 308 to change geometries. A trigger event may include, without limitation, a change in temperature, a change in differential air pressure, a presence of an electric current, or any combination of these events. For example, a presence of an electric current and an increase in heat may be a trigger event that causes the shape memory alloy in shape memory alloy spring 308 to deform shape memory alloy spring 308. In another example, a change in air pressure may result in the shape memory alloy changing geometries.

Another trigger event may be a differential in pressure and a low power actuated spring. The spring allows the valve to open under differential atmospheric pressures between the inside and outside of the enclosure. During the differential pressure, the valve will open, draining the water from the enclosure.

The shape memory alloy may be any type of shape memory material, including, without limitation, copper-zinc-aluminum-nickel, copper-aluminum-nickel, and nickel-titanium (NiTi), also referred to as Nitinol. Other materials that return to their shape, including without limitation, non-metallic and non-alloy materials, do not depart from the scope of the embodiments.

Shape memory alloy spring 308 is any type of known or available spring, such as a coil spring, a flat spring, or any other type of suitable spring. In this example, shape memory alloy spring 308 is positioned substantially between inner plate 310 and support plate 306. In a closed position, shape memory alloy spring 308 is compressed such that inner plate 310 and outer plate 304 sits in contact with the structure of enclosure 302. In other words, when smart drain valve 300 is in a closed position, smart drain valve 300 may not permit water and other fluids from entering enclosure 302 through smart drain valve 300 and/or smart drain valve 300 may not permit water and other fluids from escaping from enclosure 302 through smart drain valve 300. However, moisture, water, or other fluids may be able to enter enclosure 302 through other openings and parts of enclosure 302 that are not watertight. Moisture may also be able to accumulate in enclosure 302 through condensation and other processes.

When a trigger event occurs, shape memory alloy spring 308 changes geometry. When the shape memory alloy in shape memory alloy spring 308 changes geometries, shape memory alloy spring 308 uncoils, expands, actuates, or otherwise changes shape to move inner plate 310 out of contact with support plate 306 to create an opening or drain hole in the structure of enclosure 302. In the open position, water or other fluids are able to drain out of enclosure 302 through the opening or drain hole defined by the space between inner plate 310 and support plate 306. In this manner, smart drain valve 300 uses shape memory alloys for valve actuation.

The valve may also be operated by low power current via actuator switch 314 at operator station 312. The current deforms the memory shape alloy in the spring material and allows the water to drain out through the valve. This allows the operator to have complete control and prevents the valve from opening until directed by the operator. After draining of the water is complete, actuator switch 314 is reversed and the spring returns to its original condition closing the valve and sealing the enclosure or structure. Smart drain valve 300 solves the issues of access, remote operation, operation during flight, low cost, lightweight, and low power consumption.

Figure 4:
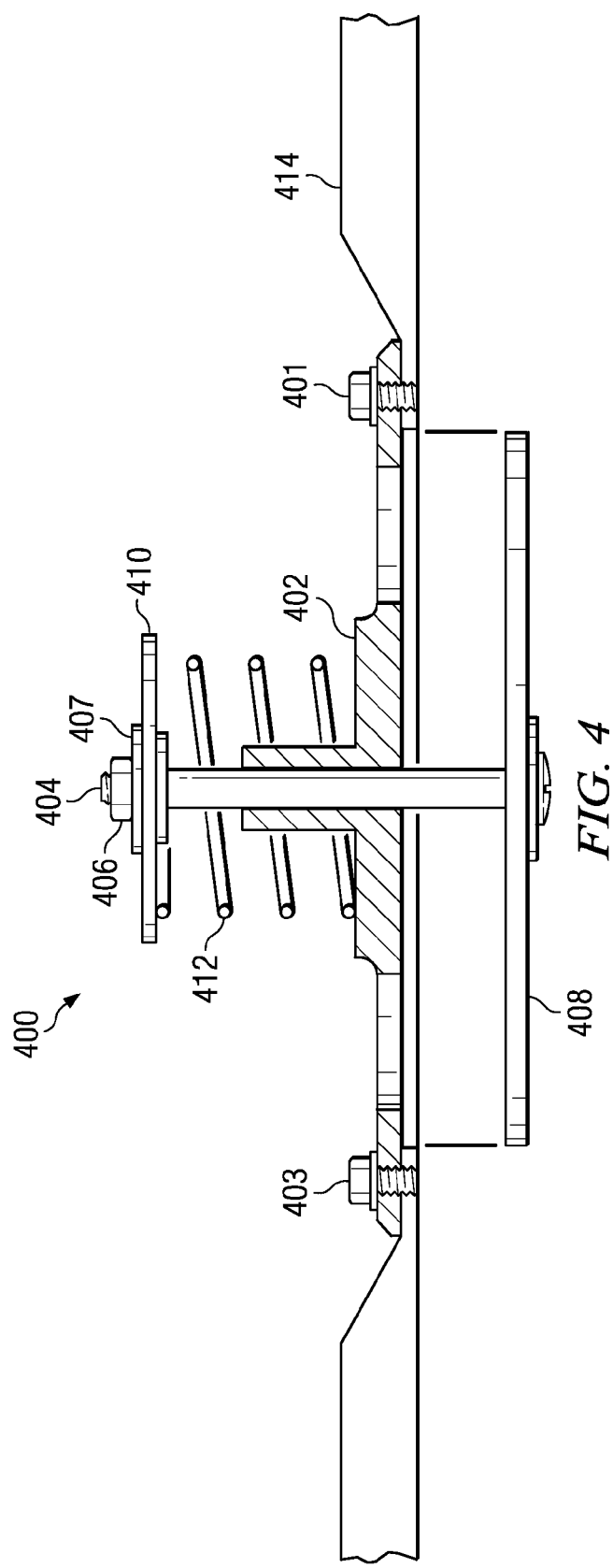
FIG. 4 is a block diagram of a cross-sectional view of a smart drain valve having a smart memory alloy coil spring in accordance with an advantageous embodiment.

FIG. 4 is a block diagram of a cross-sectional view of a smart drain valve having a smart memory alloy coil spring in accordance with an advantageous embodiment. Smart drain valve 400 is a drain valve having a spring made of a memory shape alloy, such as smart drain valve 300 in FIG. 3. In this example, smart drain valve 400 is a smart drain valve with a coil spring. A coil spring may also be referred to as a helical spring. A coil spring is a mechanical device that may be used to maintain force between contacting surfaces.

Smart drain valve 400 is a drain valve in an enclosure, such as, without limitation, a compartment, a pod, or any other structure having an interior space capable of collecting moisture, water, or other fluids in the interior space. In this example, smart drain valve 400 is a drain valve in a pod.

Bolts 401 and 403 pass through support plate 402 and connect support plate 402 to pod assembly 414. Bolt 404 is secured with nut 406 and, optionally, washer 407. Bolt 404 passes through the approximate center of outer plate 408. Bolt 404 also passes through the approximate center of inner plate 410. In other words, inner plate 410 is connected to a first end of bolt 404 with nut 406. Outer plate 408 is connected to an opposite end of bolt 404. Outer plate 408 may be connected to the opposite end of bolt 404 with a nut (not shown).

Spring 412 is generally positioned between inner plate 410 and support plate 402. Spring 412 is made of a shape memory alloy. In this example, spring 412 is made of Nitinol. However, spring 412 may be made of any type of shape memory alloy. In FIG. 4, spring 412 is compressed so that smart drain valve 400 is in an open position. In other words, a trigger event has occurred to cause spring 412 to deform and compress to move smart drain valve 400 to an open position. While in this open position, moisture or other fluid inside an enclosure in pod assembly 414 is allowed to drain through the open smart valve drain. When the trigger event is no longer present, spring 412 returns to its extended configuration and smart spring drain valve 400 closes.

Figure 5:
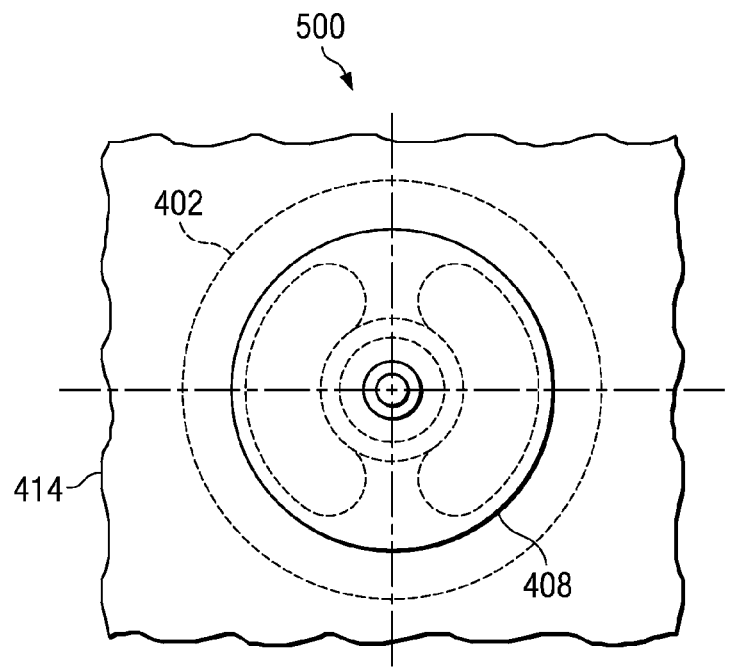
FIG. 5 is a block diagram of a top view of a smart drain valve having a smart memory alloy coil spring in a closed position in accordance with an advantageous embodiment.

FIG. 5 is a block diagram of a top view of a smart drain valve having a smart memory alloy coil spring in a closed position in accordance with an advantageous embodiment. Smart drain valve 500 is a drain valve having a spring made of a memory shape alloy, such as smart drain valve 300 in FIG. 3. In the closed position, inner plate 408 is in contact with support plate 402. In the closed position, water and other fluids cannot enter or exit pod assembly 414 through smart drain valve 500. In this example, smart drain valve 500 is a smart drain valve with a coil spring.

Figure 6:
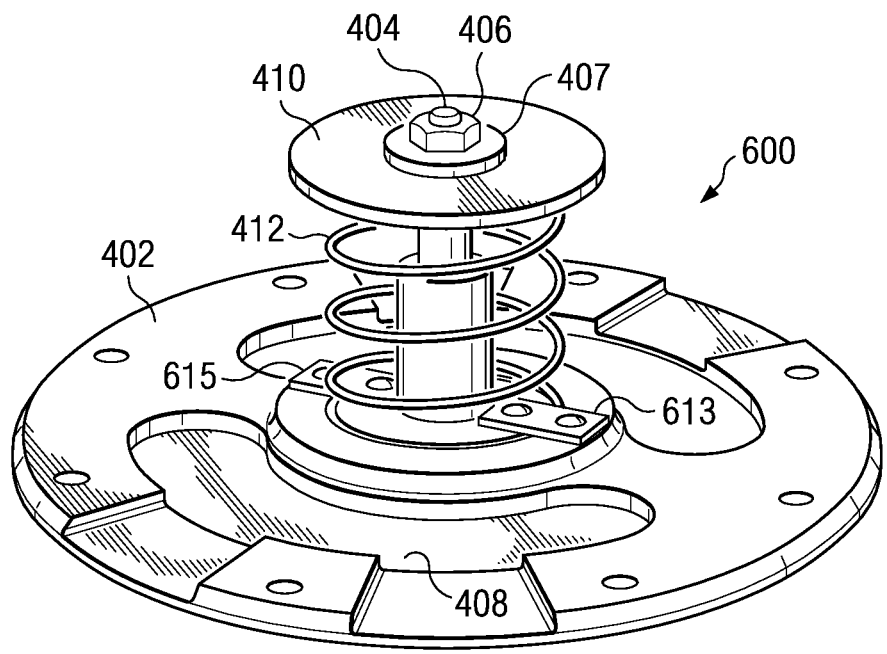
FIG. 6 is a block diagram of a top view of a smart drain valve having a smart memory alloy coil spring in an open position in accordance with an advantageous embodiment.

FIG. 6 is a block diagram of a top view of a smart drain valve having a smart memory alloy coil spring in an open position in accordance with an advantageous embodiment. Smart drain valve 600 is a drain valve having a spring made of a memory shape alloy, such as smart drain valve 300 in FIG. 3. In this example, smart drain valve 600 is a smart drain valve with a coil spring in an open position in which coil spring 412 is in an uncoiled or decompressed configuration. Coil spring 412 may be secured to valve support plate 402 by spring retainers 613 and 615.

Figure 7:
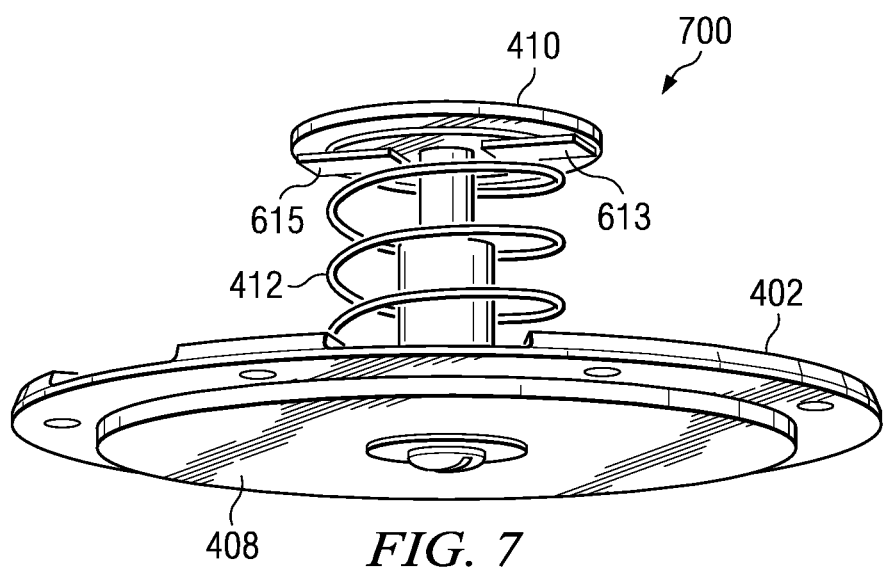
FIG. 7 is a block diagram of a side view of a smart drain valve having a smart memory alloy coil spring in accordance with an advantageous embodiment.

FIG. 7 is a block diagram of a side view of a smart drain valve having a smart memory alloy coil spring in accordance with an advantageous embodiment. Smart drain valve 700 is a drain valve having a spring made of a memory shape alloy, such as smart drain valve 300 in FIG. 3. In this example, smart drain valve 700 is a smart drain valve having a coil spring in an open position.

FIG. 8 is a block diagram of a cross-sectional view of a smart drain valve having a smart memory alloy flat spring in accordance with an advantageous embodiment. Smart drain valve 800 is a drain valve having a spring made of a memory shape alloy, such as smart drain valve 300 in FIG. 3. Slider stop 802 may connect to slider 804, and slider 804 may pass through the center of outer plate 808 and inner plate 814. Spring clips 810 and 812 are flat springs made of shape memory alloy. Spring clips 810 and 812 are in a closed position.

Bolts 816 and 818 pass through inner plate 814 and pod assembly 820. Bolts 816 and 818 may be secured using one or more nuts. Spring clips 810 and 812 are positioned between inner plate 814 and outer plate 808. When a trigger even occurs, spring clips 810 and 812 change configurations to move smart drain valve 800 into an open position.

FIG. 9 is a block diagram of a top view of a smart drain valve having a smart memory alloy flat spring in a closed position in accordance with an advantageous embodiment. Smart drain valve 900 is a drain valve having a spring made of a memory shape alloy, such as smart drain valve 300 in FIG. 3. In this example, smart drain valve 900 is a smart drain valve with a flat spring in a closed position. In the closed position, inner plate 814 is in contact with pod assembly 820.

Figure 10:
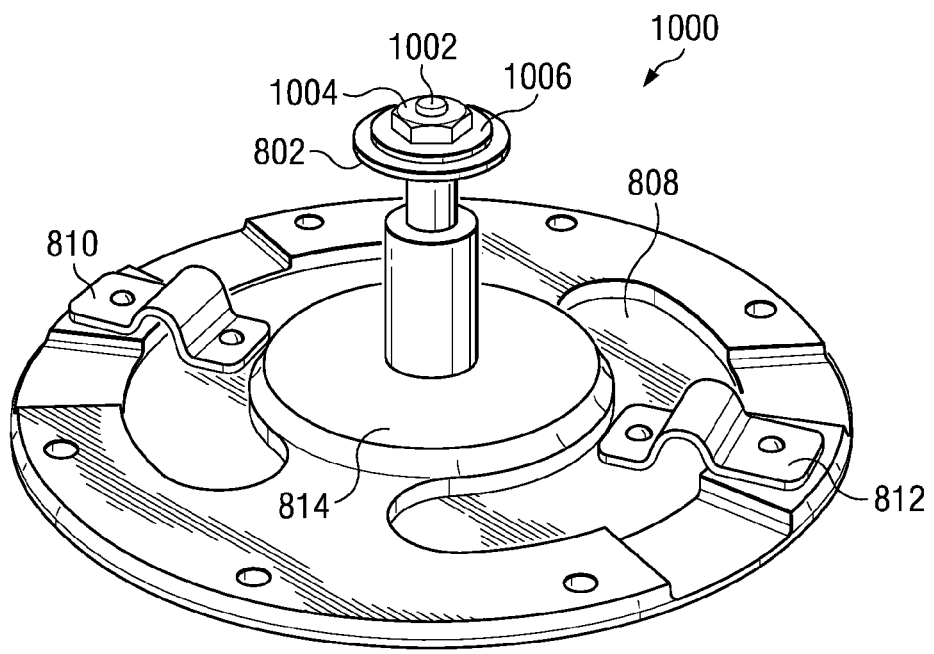
FIG. 10 is a block diagram of a top view of another smart drain valve having a smart memory alloy spring in a closed position in accordance with an advantageous embodiment.

FIG. 10 is a block diagram of a top view of another smart drain valve having a smart memory alloy spring in a closed position in accordance with an advantageous embodiment. Smart drain valve 1000 is a drain valve having one or more springs made of a memory shape alloy, such as smart drain valve 300 in FIG. 3.

In this example, bolt 1002 runs through the approximate center of inner plate 814. Bolt 1002 is secured with nut 1004 and washer 1006. Spring clips 810 and 812 are flat springs in a closed position.

Figure 11:
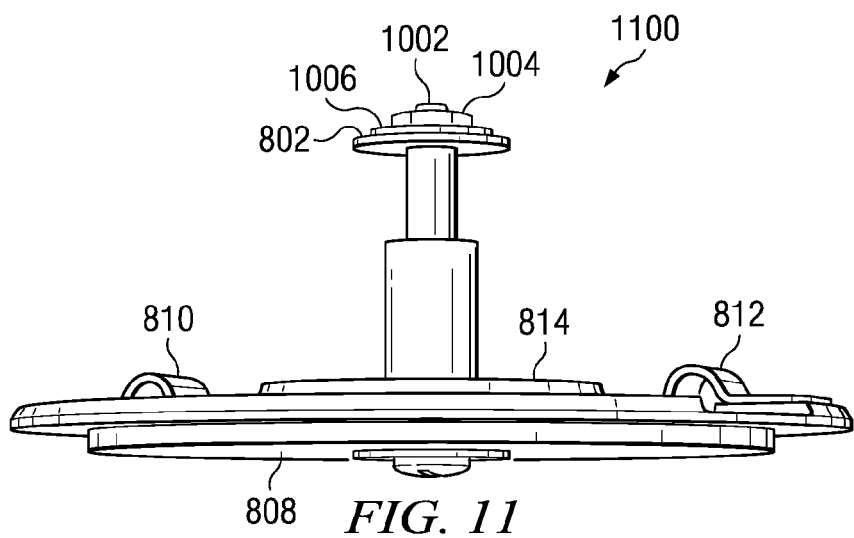
FIG. 11 is a block diagram of a side view of a smart drain valve having a smart memory alloy flat spring in accordance with an advantageous embodiment.

FIG. 11 is a block diagram of a side view of a smart drain valve having a smart memory alloy flat spring in accordance with an advantageous embodiment. Smart drain valve 1100 is a drain valve having one or more springs made of a memory shape alloy, such as smart drain valve 300 in FIG. 3. In this example, spring clips 810 and 812 are flat springs made of shape memory alloys in a closed position.

Shape memory alloy materials are used for the springs in both the coil spring and flat spring smart memory valve configurations because they provide a light weight and low cost method of actuating the valve from the delta pressure between the outside and the inside of the enclosure or changes in temperature. These shape memory alloys also allow for remote actuation and positive control of the valve by an operator sending an electric current to the smart drain valve. The use of an electric current to actuate the valve allows for operational flexibility without the need for sealed solenoid operated valves.

Figure 12:
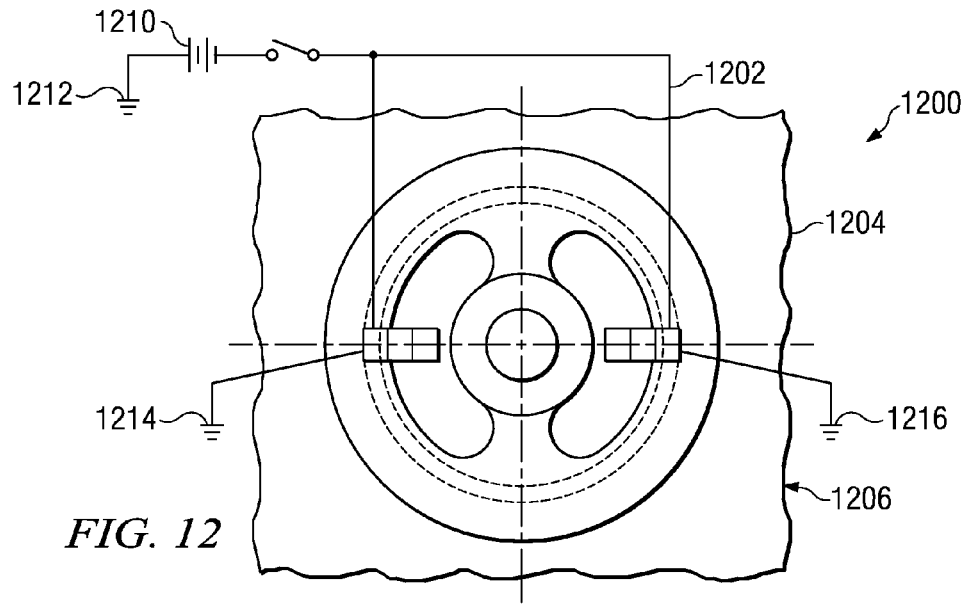
FIG. 12 is a block diagram of an electrical schematic for delivering a current to a smart drain valve in accordance with an advantageous embodiment.

FIG. 12 is a block diagram of an electrical schematic for delivering a current to a smart drain valve in accordance with an advantageous embodiment. Electrical schematic 1200 is a schematic showing electrical wiring 1202 for delivering a current to smart drain valve 1204. Smart drain valve 1204 is a drain valve having one or more springs made of a memory shape alloy, such as smart drain valve 300 in FIG. 3. In this example, the one or more springs are made of a shape memory alloy that changes configuration in the presence of an electric current.

In this example, electrical wiring 1202 delivers an electric current to smart drain valve 1204. Electrical wiring 1202 may run through pod assembly 1206, over an outer surface of pod assembly 1206, over an inner surface of pod assembly 1206, partially over a surface of pod assembly 1206 and partially through pod assembly 1206. The electrical schematic shown in FIG. 12 is not meant as a limitation as to the manner in which a current may be delivered to a smart drain valve. The electric current may be delivered to smart drain valve 1204 by any known or available method, process, or apparatus.

Power source 1210 generates the electric current. In this example, power source 1210 is a battery. However, power source 1210 may also be implemented using any source of electric current, such as, without limitation, a connection to an electrical outlet, a electric generator, or any other source of electric current. Grounds 1212, 1214, and 1216 connect the electric circuit shown in electrical schematic 1200 to the ground or the Earth.

The springs shown in FIG. 3-12 are only exemplary embodiments of springs made of shape memory alloys. The embodiments are not limited to the types of springs and the configurations of springs and parts in the drain valves shown in FIGS. 3-12. The shape memory alloy spring used in the smart memory valve of the embodiments may be any type of spring in any type of configuration for opening and closing a drain valve in accordance with the advantageous embodiments. Moreover, the smart drain valve may be a drain valve having additional parts not shown in FIGS. 3-12 without departing from the scope of the advantageous embodiments. Finally, the smart drain valve in accordance with the advantageous embodiments may be any type of drain valve having a spring made of shape memory alloys with fewer parts than the parts shown in FIGS. 3-12 without departing from the scope of the invention.

Figure 13:
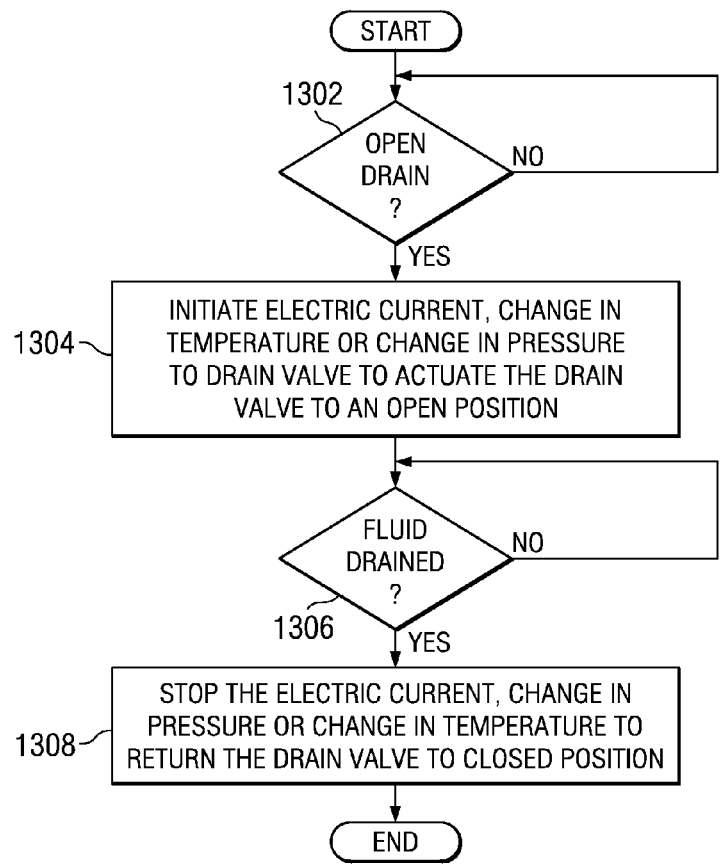
FIG. 13 is a flowchart illustrating a process for opening a smart drain valve having a smart memory alloy spring that changes geometry in the presence of an electric current in accordance with an advantageous embodiment.

FIG. 13 is a flowchart illustrating a process for opening a smart drain valve having a smart memory alloy spring that changes geometry in the presence of an electric current in accordance with an advantageous embodiment. The process in FIG. 13 may be implemented by a human user or by a software process initiating generation of an electric current through electrical wiring to a smart drain valve, such as electrical wiring 1202 to smart drain valve 1204 in FIG. 12.

The process begins by making a determination as to whether to open the smart drain valve (operation 1302). If the valve is to be opened, a change in pressure, a change in temperature, or an electric current is sent to the smart valve to actuate the valve to an open position (operation 1304). A determination is made as to whether the fluid has drained (operation 1306). When the fluid is drained, the process stops sending the electric current, the temperature change, or the change in pressure to return the smart valve back to the closed position (operation 1308) with the process terminating thereafter.

In this example, the smart shape alloy changes shape when exposed to an electric current. The electric current may be generated when a human user or a software process triggers the generation of an electric current to be sent to the smart drain valve. However, the shape memory alloy may be a shape memory alloy that changes shape in the presence of a change in air pressure and/or a change in temperature. In which case, an electric current may not be necessary to open or close the smart drain valve.

For example, if the shape memory alloy in the smart drain valve changes configuration in response to a change of air pressure, the smart drain valve opens automatically without any human intervention or action by a software process when a change in air pressure occurs. The spring allows the valve to open under differential atmospheric pressures between the inside and outside of the enclosure. During the differential pressure, the valve will open, draining the water and subsequent moisture from the enclosure structure.

The change in air pressure may occur due to the accumulation of fluid in the enclosure in which the drain valve is located. When the smart drain valve actuates to an open position, the fluid drains out, and the air pressure equalizes. When the air pressure equalizes the original air pressure, the memory shape alloy returns to its original shape, and the smart drain valve automatically closes without any human intervention or action by a software process.

Likewise, the spring in the smart drain valve may be composed of shape memory alloy that changes shape in the presence of heat. In this embodiment, when the smart drain valve is exposed to an increase in temperature, the shape memory alloy changes configuration, and the smart drain valve opens. When the heat source is removed and/or the temperature drops back down to a temperature that is below the shape memory alloys temperature change threshold, the shape memory alloy returns to its original shape, and the smart drain valve closes.

The smart drain valve of the illustrative embodiments may be manufactured in accordance with any known or available methods for manufacturing drain valves. The one or more springs associated with the smart drain valves are made of shape memory alloys in accordance with the advantageous embodiments. The one or more springs may be manufactured in accordance with any appropriate methods for manufacturing a spring using shape memory alloys. Any type of known or available shape memory alloys may be used to manufacture the one or more springs.

The smart drain valve of the illustrative embodiments eliminates the problems of solenoid operated drain valves, which are weight and system complex. The smart drain valves may be technician operated and capable of being remotely actuated. The smart drain valves may also be actuated automatically due to differential pressure or temperature change without human intervention or action by a technician. In this manner, water can be easily removed from unwanted areas. In addition, aircraft turn around or mission ready preparation time is reduced. Moreover, drain plugs do not have to be installed before a water landing mission is undertaken because the drain valve can be opened and closed by changing the configuration of the shape memory alloy.

In addition, a simple installation of the smart drain valve assembly and a single cutout in the structure associated with the enclosure or pod is all that is required. The smart drain valve is lightweight because solenoids and other electromechanical means of operation are not required. Thus, the smart drain valve may provide a lightweight effective method of removing moisture and water from pods, structure, and avionics and non-avionics enclosures. Removing the water from these enclosures can substantially increase the life of structures by minimizing corrosion issues The smart drain valve has low manufacturing costs, and the smart drain valve can be produced by a relatively simple manufacturing process. The smart drain valve has an automatic or remote operation. The smart drain valve also consumes low power when in use and eliminates preflight aircraft preparation for either removal or installation of the fuselage plugs.

The smart drain valve eliminates water in the bilge area during a flight or mission, rather than requiring maintenance personnel to wait until after the aircraft lands to drain the water from the bilge area or other enclosure. When the drain valve is installed, the movable valve plate is flush to the surface.

The flowcharts and block diagrams in the different depicted embodiments illustrate the architecture, functionality, and operation of some possible implementations of the apparatus and methods. The function or functions noted in the flowchart operations may occur out of the order noted in the figures. For example, in some cases, two operations shown in succession may be executed substantially concurrently, or the operations may sometimes be executed in the reverse order, depending upon the operation involved.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A drain valve comprising:
   a first plate fastened to an interior surface of an enclosure on an aircraft, the first plate and the surface each comprising a respective substantially planar segment, each planar segment being substantially parallel to the other substantially planar segment;
   a bolt passing through an extension of the first plate and configured to move linearly through and substantially orthogonal to the substantially planar segment of the first plate, the extension being substantially orthogonal to the substantially planar segment of the first plate;
   a second plate connected to a first end of the bolt, the second plate being: substantially planar, substantially parallel to the first plate, and configured to transition between a first position in direct contact with the first plate, and a second position separated from the first plate in response to a linear movement of the bolt, such that an opening in the first plate permits fluid to exit the enclosure with the second plate in the second position, the first position comprising a first surface of the second plate being flush with a second outer surface of the enclosure, the first surface being a substantially planar surface facing away from the enclosure;

a third plate connected to a second end of the bolt such that the bolt, the third plate, and the second plate move linearly together, the third plate configured such that the third plate limits a distance the second plate can move away from the first plate, and a shape memory alloy spring directly connected to both the first plate and the third plate, the shape memory alloy spring configured to deform, into a first shape and a second shape to position the second plate in the first position and the second position respectively.

2. The drain valve of claim 1 wherein the shape memory alloy spring is nickel-titanium.

3. The drain valve of claim 1 wherein the shape memory alloy spring is copper-aluminum-nickel.

4. The drain valve of claim 1 wherein the shape memory alloy spring is copper-zinc-aluminum-nickel.

5. The drain valve of claim 1 wherein the second end of the bolt is opposite the first end.

6. The drain valve of claim 1 wherein the shape memory alloy spring changes configuration in response to a change in pressure, and wherein the drain valve opens in response to differential atmospheric pressures between an inside of the enclosure and an outside of the enclosure.

7. The drain valve of claim 1 wherein the shape memory alloy spring changes configuration in response to a change in temperature.

8. The drain valve of claim 1, wherein the first plate directly contacts the second plate unless a trigger event occurs.

9. The drain valve of claim 1, wherein the first plate comprises a plurality of fastener holes.

10. The drain valve of claim 1, such that the shape memory alloy spring changes configuration in response to an electrical current.

11. The drain valve of claim 1, such that the shape memory alloy spring comprises a flat spring.

12. A drain valve positioned on an aircraft, the drain valve comprising:

an outer plate configured to transition between a first position and a second position through a linear movement of a slider connected to the outer plate, the first position comprising a surface of the outer plate being substantially flush with an exterior surface of the aircraft, the surface facing away from an interior of the aircraft;

an inner plate fastened to an interior surface of the aircraft, the inner plate and the outer plate being substantially planar such that direct contact between the inner plate and the outer plate in the first position restricts fluid flow through an opening in the inner plate, and a separation between the inner plate and the outer plate in the second position permits fluid flow through the opening in the inner plate;

a slider stop connected to the outer plate, the slider stop configured to limit a distance the outer plate moves away from the inner plate;

an extension of the inner plate configured to encircle the slider, a first end of the slider connected to the outer plate, and a second end of the slider connected to the slider stop, the outer plate, and the slider stop connected to each other and configured to move linearly as the slider moves through the extension; and a shape memory alloy spring surrounding the extension of the inner plate and contacting the inner plate and the slider stop, the shape memory alloy spring configured to hold the outer plate in the first position, and in response to a trigger event to push the outer plate away from the inner plate.

13. The drain valve of claim 12, the trigger event being a differential in pressures between an inside of an enclosure associated with the drain valve and an outside of the enclosure.

14. The drain valve of claim 12 wherein the trigger event is a change in temperature.

15. The drain valve of claim 12, wherein the shape memory alloy spring is nickel-titanium.

16. The drain valve of claim 12, wherein the shape memory alloy spring is copper-aluminum-nickel.

17. The drain valve of claim 12, wherein the shape memory alloy spring is copper-zinc-aluminum-nickel.

18. The drain valve of claim 12, wherein the trigger event is an electric current.

19. The drain valve of claim 12, wherein the shape memory alloy spring comprises a coil spring.

* * * * *